United States Patent [19]

Hartmann et al.

[11] Patent Number: 4,839,954
[45] Date of Patent: Jun. 20, 1989

[54] MANIPULATION DEVICE FOR HOSE MOUNTING

[75] Inventors: Gunter Hartmann; Ralf Swoboda, both of Munich; Robert Lang, Syrgenstein, all of Fed. Rep. of Germany

[73] Assignee: Siemens Aktiengesellschaft, Berlin and Munich, Fed. Rep. of Germany

[21] Appl. No.: 43,315

[22] Filed: Apr. 28, 1987

[30] Foreign Application Priority Data

Apr. 28, 1986 [DE] Fed. Rep. of Germany ....... 3614362

[51] Int. Cl.⁴ ............................................ B23P 19/02
[52] U.S. Cl. ......................................... 29/235; 29/237
[58] Field of Search ................ 408/83.5; 29/235, 237, 29/785, 792, 335, 35.5; 279/23 R; 269/254 R

[56] References Cited

U.S. PATENT DOCUMENTS 3,007,097 10/1961 Shelley et al. ...................... 29/35.5

FOREIGN PATENT DOCUMENTS 2120965 5/1982 United Kingdom ................. 29/35.5

*Primary Examiner*—Robert C. Watson

[57] ABSTRACT

A manipulation device, particularly for use with an industrial robot, which has a plurality of double-jaw grippers on a turret base member. The manipulation device includes a suction member for workpiece handling which is arranged on the turret base member parallel to a rotational axis thereof. The individual grippers are attached to the turret base member at a predetermined inclined angle. Additional joining aids are provided on the grippers to prevent buckling of hoses to be mounted on fittings of the workpiece during a slip-on operation. The required amount of hose to be utilized is respectively cut off at an "IR side" of a hose offering unit from hoses stored on hose reels. The end of the hose to be mounted is also widened in a preparatory station. The manipulation device executes all handling and joining operations for mounting a hose onto a corresponding fitting.

16 Claims, 2 Drawing Sheets

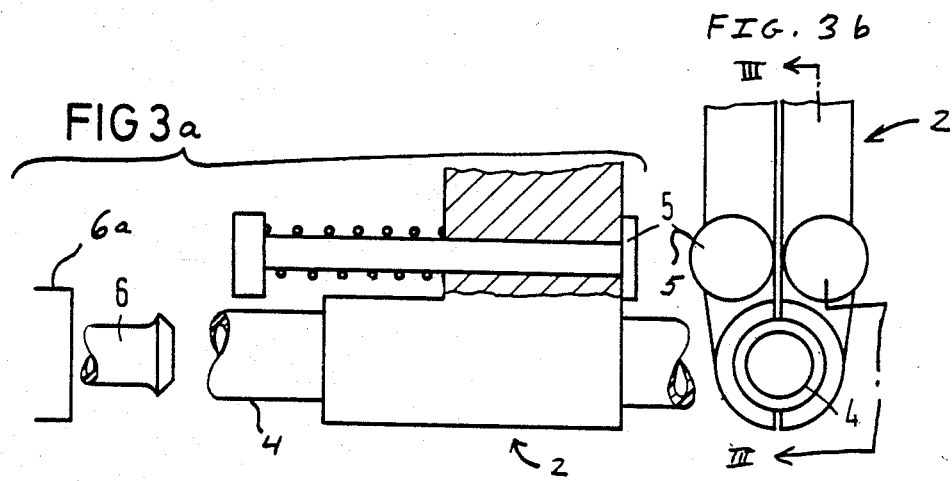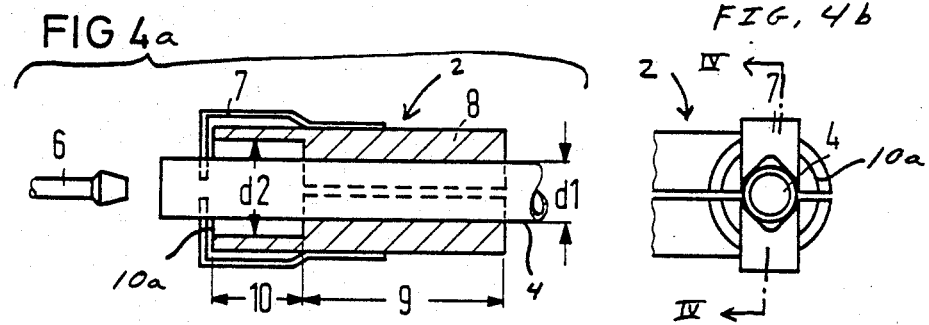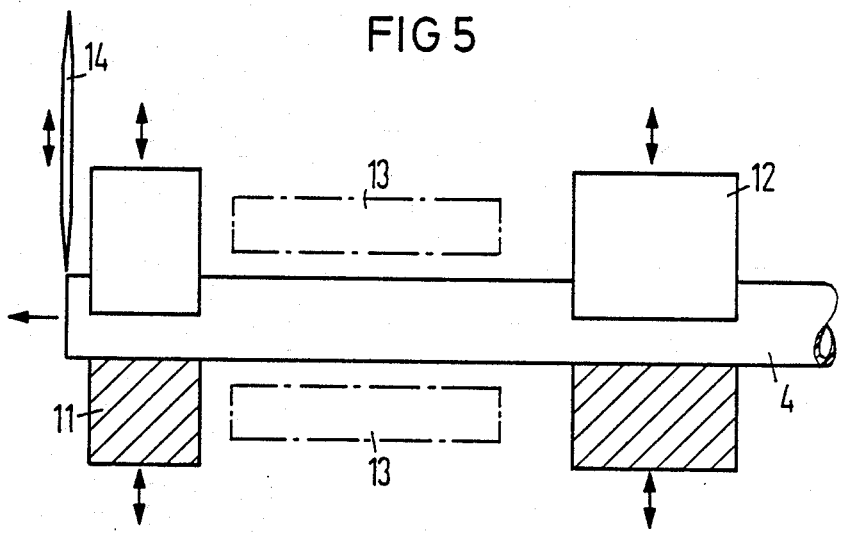

MANIPULATION DEVICE FOR HOSE MOUNTING

BACKGROUND OF THE INVENTION

The present invention relates in general to manipulation devices and, in particular, to a manipulation device for automatically mounting hoses onto corresponding fittings. The manipulation device may be utilized in conjunction with an industrial robot or other types of automated machinery.

In the automated manufacturing of many types of appliances and other devices, such as dishwashers, for example, one step in the manufacturing process involves mounting of hoses, particularly flexible hoses, onto corresponding fittings on the manufactured unit. Although the manufacturing processes are automated, it has typically been found necessary in the prior art manufacturing process to manually mount the hose onto the fitting. These fittings are typically formed on molded plastic parts. Also, the hoses required for automatic mounting are stored in magazines ordered according to the type and size of the hose or, in the alternative, the hoses may be cut to size after being drawn "endlessly" from a hose reel.

An article entitled "Montage biegeschlaffer Teile mit Industrierobotern" is printed in the Zeitschrift fuer industrielle Fertigung 76 (1986), No. 1, pp. 8–11, and discloses automatic mounting of flexible parts in a manufacturing process. However, no structural details except for the illustration of a number of gripper jaw shapes are depicted in the article.

SUMMARY OF THE INVENTION

It is an objective of the present invention to automate the mounting of water or air hoses, for example, PVC or PVC with fiber reinforcement type hoses, onto water intakes and fittings for level generators of dishwashers, in particular. The present invention, of course, is also applicable to mounting such hoses onto corresponding fittings for any other type of desired appliance or device. An advantage of the present invention is that when equipping units requiring hoses differing in diameter, a constant refitting of the manipulation device coupled to an industrial robot is avoided.

It is a feature of the present invention that preparatory cutting of the hoses to a predetermined length is not required before the actual time of mounting the hose onto the corresponding fitting.

A manipulation device constructed according to the present invention is used for mounting hoses having different diameters onto corresponding fittings. A turret base member has at least a predetermined rotational axis and a plurality of double-jaw grippers attached to the turret base member at a predetermined angle inclined toward the rotational axis. Also, a mechanism for releasably holding the fitting is attached to the turret base member parallel to the rotational axis. A selected one of the double-jaw grippers is actuated to mount a selected hose having a predetermined diameter onto a corresponding fitting. A structure for assisting the gripper in mounting the hose onto the fitting is also attached to the gripper.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawings, in the several figures of which like reference numerals identify like elements, and in which:

FIG. 3a is a side view of a gripper assembly for mounting thick walled hoses, shown with a partial cross-section taken along section line III—III in FIG. 3b;

FIG. 3b is a front view of the FIG. 3a gripper assembly;

FIG. 4a is a cross-sectional side view of an alternative assembly for mounting thin walled embodiment of the gripper assembly for mounting thin walled hoses, taken along a section line IV—IV shown in FIG. 4b;

FIG. 4b is a front view of the FIG. 4a gripper assembly; and

FIG. 5 is a schematic representation of a side view of a hose offering device used with the present invention.

DESCRIPTION OF THE PREFERRED EMBODIMENT

The present invention has general applicability but is most advantageously utilized with an industrial robot for mounting flexible hoses having different diameters onto corresponding fittings.

Figure 1:
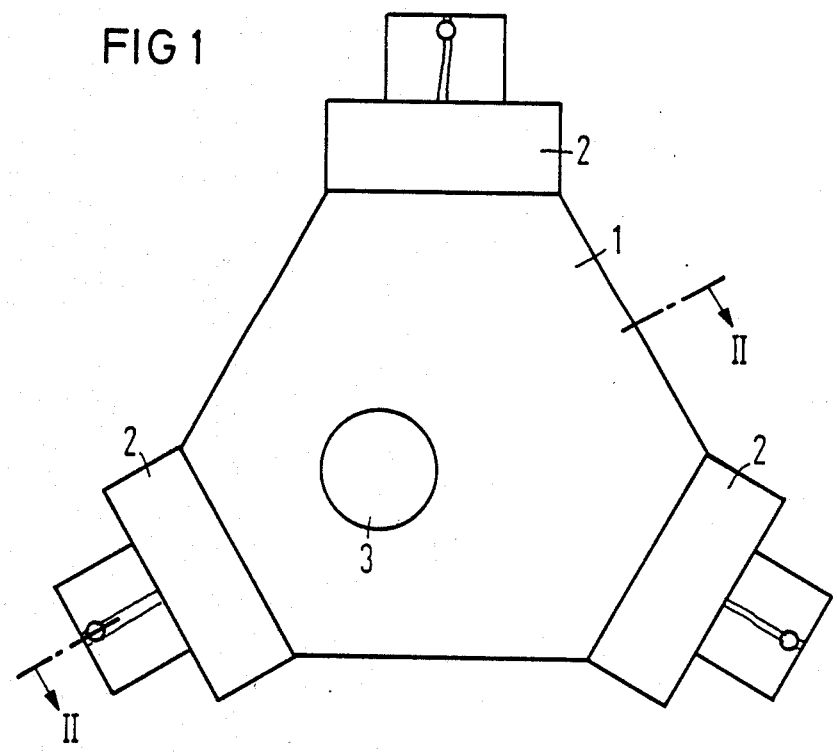
FIG. 1 is a plan view of a turret base member depicting three double-jaw grippers attached thereto in schematic form.
Figure 2:
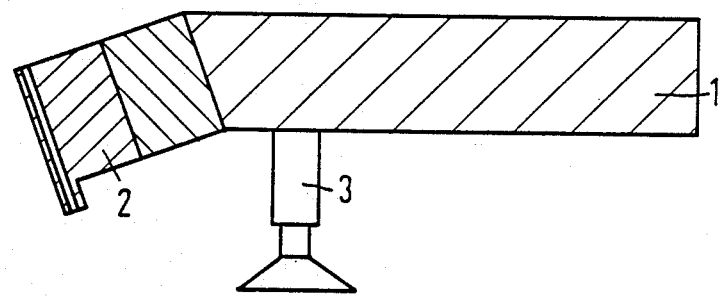
FIG. 2 is a cross-sectional view of the FIG. 1 turret base member taken along the section line II—II.

Referring now to FIGS. 1 and 2, three double-jaw gripper pairs 2 are arranged on a turret base member 1. Each of the gripper pairs 2 is designed for a specific hose diameter or type. Each of the gripper pairs 2 is actuated by a central pneumatic drive not shown) as is well known in the art. Furthermore, the turret base member 1 is coupled to an industrial robot by methods also well known in the art. A suction member 3 is used for handling the fitting or a workpiece. As utilized with the preferred embodiment, the fittings are molded plastic parts which may be utilized for water intakes and parts for level generators in the dishwasher manufacturing.

Because the hoses which are to be attached to the fittings are flexible, it has been a problem in the prior art that automated machinery which attempts to attach an end of the hose to the fitting causes the hose to buckle and move away from a correct position for mounting the hose on the fitting. The present invention also overcomes these drawbacks in the prior art with an embodiment shown in FIG. 3a and 3b for mounting thick walled hoses and in an alternative embodiment shown in FIG. 4a and 4b for mounting thin walled hoses. In the FIG. 3a and 3b embodiment, a hose 4 is mounted on a molded fitting 6. Two resilient guide pins 5 are provided in the gripper jaws 2 to prevent buckling or an excursion of the hose 4.

As shown in FIGS. 4a and 4b, a hose 4 is centered by two resilient jaws 7 attached to the double-jawed gripper 2. The hose 4, having a diameter d1, is clamped in a region 9 in a base member 8 of the double-jawed gripper 2. A guide sleeve 10a having a diameter d2 is located in a region 10 of the base member 8. The guide sleeve 10a prevents movement or an excursion of the hose 4 when it is mounted onto the fitting 6.

A necessary step in the automated manufacturing process is for the manipulation device, controlled by the industrial robot, to select a hose from a hose supply. To assist the manipulation device in this operation, FIG. 5 shows the essential components of a hose offering means or device. Front clamp jaws 11 and back clamp jaws 12 are used to hold the hose 4 in a defined position for being grasped by the gripper 13. These grippers 13 schematically shown in FIG. 5 correspond to the double-jawed grippers 2 in FIGS. 1 and 2. The arrangement of the gripper jaws 2 on the turret base member 1 at a predetermined inclined angle to the turret base member 1 enables improved accessibility of the gripper jaws 2 when obtaining a hose from the hose offering device shown in FIG. 5.

Typically in a manufacturing process, the hoses are stored on hose reels and an industrial robot draws off from the hose reel a predetermined length of hose which then must be cut. As shown in FIG. 5, the hose 4 is cut by a knife 14. Such a hose offering device is provided for every hose diameter or type utilized in the manufacturing process.

By way of example, there will now be described the execution in a hose mounting cell of the mounting of hoses to fittings on dishwashing machines by an industrial robot.

For the purposes of this example, the manipulation device will be referred to as "IR". The IR takes a fitting or molded plastic part having a fitting from a stack magazine (not shown) with the suction member 3. The blown plastic parts are deposited in the stack magazines ordered in terms of type. The IR deposits this plastic part in a fixture (shown as 6a in FIG. 3a) wherein the part is fixed for further work steps. As is known in the art, the part or fitting may be held in place by, for example, pneumatic tighteners. A retaining clamp is subsequently positioned over the corresponding fitting 6 of the blown part by means of a feeder unit (not shown). Parallel thereto, the IR travels to the hose offering device (see FIG. 5) for the first hose and a gripper of the IR takes the hose end at the clamping area of the hose offering device composed of the clamped jaws 11 and 12. Since different hoses are to be processed, one clamp unit and a corresponding gripper at the IR are provided per hose type. The selected pneumatic two jaw gripper 2 on the turret base member 1 is rotated into the respective work position. Such rotation as is known in the prior art may be by, for example, the sixth axis of the IR (flange rotational axis).

After the front clamp jaws and back clamp jaws of the hose offering device are released, the IR takes the desired hose length from the reel. After that, the hose is retensed by the front and back clamp jaws and is cut off at the "IR side" (see FIG. 5). The IR now conducts the loose hose whose plug-on end is fixed in the IR gripper to a preparatory station in which the plug on end is widened (for example, by means of a cold conical arbor, a heated conical arbor, or an expanding arbor) and then pushes the end of the hose onto the corresponding fitting of the plastic part. This operation is repeated until all hoses have been mounted. With its suction gripper 3, the IR then takes the plastic part out of the fixture 6a (shown schematically in FIG. 3a) and deposits it in a magazine for finished assemblies.

Furthermore, the mounting of the hose onto a corresponding fitting of the plastic part can be facilitated by using a lubricant which, for example, may be introduced into the area of mounting of the hose in the hose offering device or in the preparatory station.

As shown in FIG. 1, the individual double-jaw grippers 2 are combined on the turret base member 1 in a star-like fashion to form a turret gripper. Dependent on design, the individual grippers can be directly actuated by an actuator, for example, a pneumatic cylinder, or can be actuated in common by a central drive since only one respective gripper is in a work position at any given time. The gripping area of the individual grippers is adapted to the hose to be mounted on a fitting, that is, it is adapted to the diameter, plugging forces, and guidance parameters necessary for proper mounting of the hose on the fitting. This is particularly accomplished in the FIGS. 3a, 3b, 4a and 4b, embodiments. As previously mentioned, in the FIG. 3a, 3b embodiment, the two resilient guide pins 5 are provided to prevent buckling of the hose 4 during mounting on the fitting 6, particularly for thick walled hoses. For thin hoses, such as shown in FIGS. 4a and 4b, the buckling is prevented by a guide sleeve 10a having the diameter d2, which is located in the area 10. In order to prepare the hoses and then center it for mounting, two resilient centering members 7 are also attached to the gripper 2.

Since the diameters of the fittings are larger than the inside diameter of the hoses, the hose end to be plugged must be widened in order to facilitate mounting. Various units are required dependent on the hose configuration, that is, the material, the inside diameter and the wall thickness of the hose. In the simplest case, it is sufficient for the IR to slip the hose end onto a cold conical arbor. However, the widening is improved when the arbor is heated. Given large differences in diameter between the inside diameter of the hose and the outside diameter of the fittings, the hose end to be mounted should be widened by an expanding arbor, for example, by three jaws that can be centrally moved apart. It is recommended that the hose end be preheated prior to mounting onto the fitting. The preheating can, for example, be performed in a water bath at the hose offering unit depicted in FIG. 5.

The hose end to be mounted is held in the front and back clamping jaws 11 and 12 shown in FIG. 5 such that the hose can be taken by the IR gripper 2 in a defined position between the jaws 11 and 12. After a predetermined length of hose is removed from a hose reel (not shown), the hose is refixed in the jaws 11 and 12 for the next cycle and a cutting tool 14 cuts the predetermined hose length off in front of the hose offering fixture on the IR side.

The plastic part is also centered and fixed in the fixture 6a. Guide funnels (not shown) are provided per fitting for tolerance compensation and for guiding the hose end to be mounted. These guide funnels are divided such that the upper part is extended when the clamp unit opens, so that the hoses lie free for removing the part.

The invention is not limited to the particular details of the apparatus depicted and other modifications and applications are contemplated, certain other changes may be made in the above-described apparatus without departing from the true spirit and scope of the invention herein involved. It is intended therefore that the subject matter in the above depiction shall be interpreted as illustrative and not in a limiting sense.

We claim:

1. A manipulation device for use with an industrial robot for automatically mounting hoses having different diameters onto corresponding fittings, comprising:
   turret base member;
   at least three double-jaw grippers arranged on said turret base member, each of said grippers corresponding to a different predetermined hose diameter;
   means for actuating each of said grippers; and each of said gripper being attached to said turret base member at an angle thereto, thereby allowing said gripper to grip a hose being held by a means for holding the hose in a defined position and to cause a predetermined length of hose to be obtained from a hose supply.

2. A manipulation device for use with an industrial robot for automatically mounting hoses having different diameters onto corresponding fittings, comprising:
   turret base member;
   at least three double-jaw grippers arranged on said turret base member, each of said grippers corresponding to a different predetermined hose diameter;
   means for actuating each of said grippers; and a sucker for workpiece handling of the fitting attached to said turret base member parallel to a rotational axis thereof.

3. A manipulation device for use with an industrial robot for automatically mounting hoses having different diameters onto corresponding fittings, comprising:
   turret base member;
   at least three double-jaw grippers arranged on said turret base member, each of said grippers corresponding to a different predetermined hose diameter;
   means for actuating each of said grippers; and said gripper having means for joining said hose to said fitting.

4. A manipulation device according to claim 3, wherein said means for joining is a guide sleeve contained in the jaws of said gripper.

5. A manipulation device for use with an industrial robot for automatically hoses having different diameters onto corresponding fittings, comprising:
   turret base member;
   at least three double-jaw grippers arranged on said turret base member, each of said grippers corresponding to a different predetermined hose diameter;
   means for actuating each of said grippers, and said gripper having a resilient jaw for base centering attached to each of said jaws of said gripper.

6. A manipulation device for use with an industrial robot for automatically mounting hoses having different diameters onto corresponding fittings, comprising:
   turret base member;
   at least three double-jaw grippers arranged on said turret base member, each of said grippers corresponding to a different predetermined hose diameter;
   means for actuating each of said grippers; and means for widening an end of the hose, said means for widening being provided at a preparatory station.

7. A manipulation device for use with an industrial robot for automatically mounting hoses having different diameters onto corresponding fittings, comprising:
   base member;
   plurality of double-jaw grippers arranged centrically about said base member, each of said grippers sized differently to accept correspondingly sized different diameter bases; and
   means for actuating at least a selected one of said double-jaw grippers to mount a selected hose having a predetermined diameter onto a corresponding fitting.

8. A manipulation device according to claim 7, wherein each of said grippers is attached to said turret base member at a predetermined angle relative to a rotational axis of said turret base member.

9. A manipulation device for use with an industrial robot for automatically mounting hoses having different diameters onto corresponding fittings, comprising:
   turret base member;
   plurality of double-jaw grippers arranged on said turret base member, each of said grippers sized differently to accept correspondingly sized different diameter bases;
   means for actuating at least a selected one of said double-jaw grippers to mount a selected hose having a predetermined diameter onto a corresponding fitting, and at least on one suction-type device for handling of the fitting attached to said turret base member parallel to a rotational axis thereof.

10. A manipulation device for use with an industrial robot for automatically mounting hoses having different diameters onto correspondingly fittings, comprising:
    turret base member
    plurality of double-jaw grippers arranged on said turret base member, each of said grippers sized differently to accept correspondingly sized different diameter bases;
    means for actuating at least a selected one of said double-jaw grippers to mount a selected hose having a predetermined diameter onto a corresponding fitting; and said gripper having a means for joining said hose to said fitting.

11. A manipulation device according to claim 10, wherein said means for joining comprises a guide sleeve fitted to the hose and contained in said gripper wherein said guide sleeve prevents excursion of the hose when the hose is mounted onto the fitting.

12. A manipulation device according to claim 10, wherein said means for joining comprises at least two resilient jaws attached to an outer surface of said gripper and holding an end of the hose in a centered position.

13. A manipulation device for use with an industrial robot for automatically mounting hoses having different diameters onto corresponding fittings, comprising:
    turret base member;
    plurality of double-jaw grippers arranged on said turret base member, each of said grippers sized differently to accept correspondingly sized different diameter bases;
    means for actuating at least a selected one of said double-jaw grippers to mount a selected hose having a predetermined diameter onto a corresponding fitting; and means for widening an end of the hose to facilitate coupling of the hose with the fitting.

14. A manipulation device for use in mounting hoses having different diameters onto corresponding fittings, comprising:
    turret base member having at least a predetermined rotational axis;

plurality of double-jaw grippers attached to said turret base member at a predetermined angle inclined toward said rotational axis;

at least one means for releasably holding the fitting attached to said turret base member parallel to said rotational axis;

means for actuating at least a selected one of said double-jaw grippers and coupled thereto to mount a selected hose having a predetermined diameter onto a corresponding fitting;

means for assisting said gripper in mounting the hose onto the fitting, said means for assisting attached to said gripper.

15. A manipulation device according to claim 14, wherein said means for assisting comprises a guide sleeve fitted to the hose and contained in said gripper wherein said guide sleeve prevents excursion of the hose when the hose is mounted onto the fitting.

16. A manipulation device according to claim 14, wherein said means for assisting comprises at least two resilient jaws attached to an outer surface of said gripper, said resilient jaws engaging an end of the hose to hold said hose in a centered position when said gripper grips the hose.

* * * * *